United States Patent
Clothier et al.

(10) Patent No.: US 7,572,392 B2
(45) Date of Patent: Aug. 11, 2009

(54) SCINTILLATING COMPOSITIONS FOR DETECTING NEUTRONS AND METHODS OF MAKING THE SAME

(75) Inventors: Brent Allen Clothier, Niskayuna, NY (US); Sergio Paulo Martins Loureiro, Saratoga Springs, NY (US); Venkat Subramaniam Venkataramani, Clifton Park, NY (US); Alok Mani Srivastava, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 167 days.

(21) Appl. No.: 11/651,702

(22) Filed: Jan. 10, 2007

(65) Prior Publication Data

US 2008/0166286 A1    Jul. 10, 2008

(51) Int. Cl.
*C09K 11/04* (2006.01)
*C09K 11/70* (2006.01)
*C09K 11/54* (2006.01)
*C09K 11/55* (2006.01)

(52) U.S. Cl. .......................... 252/301.6 P; 252/301.4 P; 252/646; 252/625

(58) Field of Classification Search ........... 252/301.4 P, 252/646, 625
See application file for complete search history.

*Primary Examiner*—C. Melissa Koslow
(74) *Attorney, Agent, or Firm*—Richard A. DeCristofaro

(57) ABSTRACT

Solid-state scintillating compositions for detecting neutrons comprise a $Li_4Zn(PO_4)_2$ host lattice. Methods of making scintillating compositions comprise: dissolving a lithium-6 precursor and a zinc precursor in a solvent to form a solution; combining phosphoric acid with the solution; combining a base with the solution to form a precipitate; and heating the precipitate to form a $Li_4Zn(PO_4)_2$ host lattice.

19 Claims, 1 Drawing Sheet

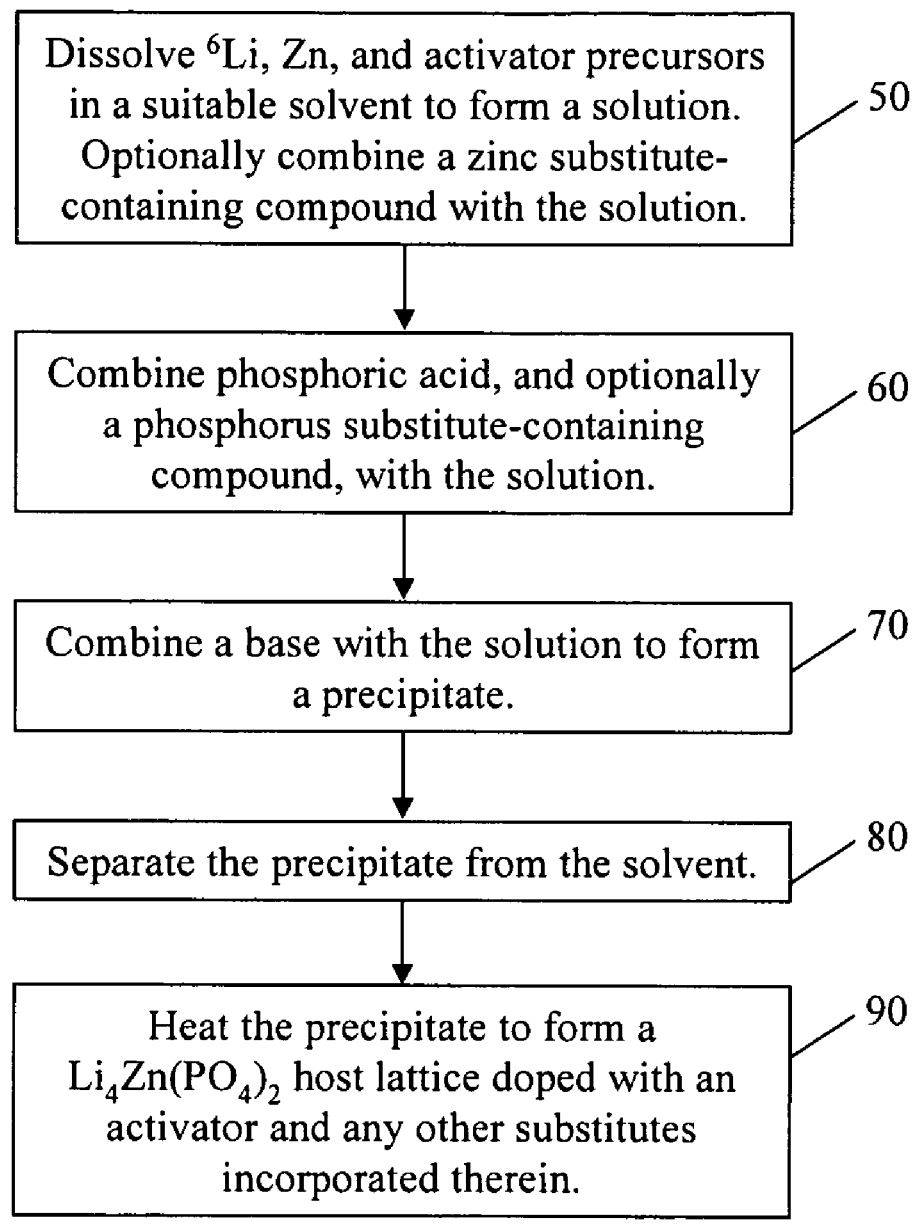
Figure

SCINTILLATING COMPOSITIONS FOR DETECTING NEUTRONS AND METHODS OF MAKING THE SAME

FEDERAL RESEARCH STATEMENT

The U.S. Government may have certain rights in this patent pursuant to contract number N66001-05-D-6012 awarded by the Department of Homeland Security.

BACKGROUND OF THE INVENTION

The present disclosure is generally related to solid-state scintillators and, more particularly, to scintillating compositions for detecting neutrons and methods of making the same.

Increasing concerns about the illegal possession, trafficking, and transport of nuclear materials, particularly by terrorist organizations, have resulted in the increased use of neutron detectors known as scintillators. Government agencies are currently fielding scintillators at seaports, airports, rail yards, and border crossings to detect neutron emissions. One aim of such agencies is to prevent terrorist organizations from smuggling nuclear materials, such as plutonium-fueled nuclear bombs or its plutonium parts, into the country.

The detection of neutrons using a scintillator usually occurs when fast moving neutrons interact with the scintillator, transferring energy to the atoms of a scintillating material or composition contained therein. As a result, the atoms are changed to an excited state. The excited atoms then lose the energy by emitting photons of light. This light can be detected by a sensitive piece of equipment called a "photomultiplier". The photomultiplier, as its name suggests, multiplies the small flash of light into a large electrical signal that can be measured. From the size of the electrical signal, the quantity of neutrons passing through the scintillators can be determined.

Currently used neutron detectors include gas scintillators, liquid scintillators, and solid-state scintillators. Gas scintillators commonly utilize a gaseous scintillating composition, such as helium-3 (a He isotope) or a boron-10 (a B isotope) containing gas, e.g., $^{10}BF_3$. Unfortunately, a relatively large containment area can be required to house the large volume occupied by the gaseous scintillating composition. For example, a gas scintillator can have about twenty 1-meter-long gas-filled tubes, the joints of which are susceptible to leaks. The manufacturing and ownership costs of such large gas scintillators can be extremely high. Further, gas scintillators have limited portability and thus cannot be easily used to patrol the borders of a country. Liquid scintillators also suffer from the drawback of being relatively large in size.

The use of solid-state scintillators is growing in popularity due to the compact nature of their resulting sensor bodies and arrays. Solid-state scintillators for neutron detection commonly employ a mixture of lithium-6 ($^6$Li, an enriched Li isotope) fluoride and silver-doped zinc sulfide, ($^6$LiF/ZnS: Ag), which produces a hybrid composition. Neutron detection by such scintillators often relies on a nuclear conversion mechanism, wherein the lithium-6 absorbs neutrons, causing the nucleus of each lithium atom to split into positively-charged triton and alpha particles. This nuclear reaction may be represented by the following formula:

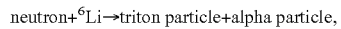

neutron+$^6$Li→triton particle+alpha particle,

The triton and alpha particles, in turn, penetrate the ZnS:Ag and induce an emission of light from its silver luminescent center.

The $^6$Li reaction remains attractive because its disintegration process proceeds directly to a ground state with no intermediate stages or by-products. Furthermore, the energies of the resulting alpha and triton particles (2.05 and 2.73 MeV, respectively) are quite distinct and large, readily enabling their detection via solid-state scintillation. However, the use of ZnS:Ag in the scintillating mixture has its drawbacks. While the ZnS:Ag luminesces brightly during triton and alpha particle penetration, it undergoes self-absorption of its own emission. This undesirable trait severely limits the useful thickness and geometry of any body constructed from $^6$LiF/ZnS:Ag mixtures. Further, the $^6$LiF/ZnS:Ag mixture also suffers from the limitation that its atoms can become excited by radiation such as gamma-ray radiation (i.e., radiation from a radioisotope), resulting in non-neutron based emissions.

The preparation of the $^6$LiF/ZnS:Ag mixture also has several disadvantages. First, two separate granular powders, i.e., a $^6$LiF powder and a ZnS:Ag powder, can be mixed, which can lead to the scattering of the emitted light. Further, a binder that occupies a significant amount of space is commonly used to hold the two powders together. The amount of space occupied by the $^6$LiF is very small compared to that occupied by both the binder and the ZnS:Ag. The effective lithium density is therefore lower than expected, reducing the probability of neutron capture. Also, the $^6$LiF and binder provide no relevant luminescent function. The triton and alpha particles must reach the ZnS:Ag before becoming energetically inactive. Combined, these loss mechanisms can make neutron sensitivity less than desired.

Currently used alternative solid-state scintillating materials, such as cerium-activated $^6$Li-silicate glasses, can be readily formed into various shapes but usually have relatively low lithium densities. Further, they fail to match the emission intensity of the $^6$LiF/ZnS:Ag composite.

Accordingly, it is desirable to develop solid-state scintillating materials that have relatively high emission intensities without being self-absorbing and that have relatively high neutron sensitivities. Further, it is desired that such scintillating materials are less sensitive to non-neutron radiation.

BRIEF DESCRIPTION OF THE INVENTION

Disclosed herein are solid-state scintillating compositions for detecting neutrons and methods of making the same. In one embodiment, a scintillating composition for detecting neutrons comprises a $Li_4Zn(PO_4)_2$ host lattice.

The scintillating compositions may be made using a unique method. In one embodiment, this method comprises: dissolving a lithium-6 precursor and a zinc precursor in a solvent to form a solution; combining phosphoric acid with the solution; combining a base with the solution to form a precipitate; and heating the precipitate to form a $Li_4Zn(PO_4)_2$ host lattice.

This summary and other features are exemplified by the following figures and detailed description.

BRIEF DESCRIPTION OF THE DRAWING

The figure is a diagram illustrating a method of making a scintillating composition for detecting neutrons in accordance with an exemplary embodiment of the invention.

DETAILED DESCRIPTION OF EXEMPLARY EMBODIMENTS

The present disclosure is directed to solid-state scintillating compositions for detecting neutrons. In an embodiment, a scintillating composition comprises a tetralithium-6 zinc bis (phosphate(V)) ($^6$Li$_4$Zn(PO$_4$)$_2$) host lattice. In another embodiment, the scintillating composition also includes an activator for doping the Li$_4$Zn(PO$_4$)$_2$ host lattice. The activator can emit light in response to neutrons being absorbed by the scintillating composition. Thus, the scintillating composition can be luminescent, which refers to its ability to emit light when neutrons are absorbed.

The Li$_4$Zn(PO$_4$)$_2$ host lattice offers two mechanisms for activator doping: (i) interstitial placement in the distorted octahedral vacancies and (ii) substitution on the intrinsic, tetrahedral Zn$^{2+}$ lattice site. The deliberate under-stoichiometry of zinc in the host lattice can be employed to enable incorporation of an activator having the same charge as Zn$^{2+}$ at the zinc site. Examples of suitable elements for activator doping include manganese, tin, ytterbium, europium, samarium. These elements may also be used in combination, such that while only one element may be present in a particular interstitial space or lattice site, a plurality of these elements may be present within the lattice as a whole.

Without being limited by theory, the scintillating compositions rely on two basic principles for the detection of neutrons. First, incoming neutrons are absorbed by lithium atoms, which in turn, activates nuclear fission. The resulting by-products of these nuclear reactions, i.e., alpha and triton particles, penetrate the host lattice and thus perturb the equilibrium state of resident electrons. Therefore, the alpha and triton particles leave a subset of the electrons in an excited energy state. Second, resident activators embedded in the host lattice serve as entrapment and recombination centers. Excited electrons in the vicinity of such activators return to their ground state, and in doing so, release energy as photons.

The wavelength of the emitted light of the photons depends on the chemical nature of the activator (i.e., the specific element) and its coordination environment in the host lattice. For example, the incorporation of a manganese activator in the host lattice can result in the emission of green light (i.e., tetragonal coordination) or red light (i.e., octahedral coordination).

In yet another embodiment, the Li$_4$Zn(PO$_4$)$_2$ host lattice can be altered by the incorporation of additional substitutes, called "zinc substitutes", at the zinc site to modify the structure of the host lattice. These zinc substitutes can confer structural stability on the host lattice when needed, for example, to compensate for substitution at the phosphorus lattice site. Alternatively, zinc substitutes, which deviate in size from Zn$^{2+}$, can serve to cause minor distortions in the host lattice and thus optimize activator emission. Examples of elements that can serve as zinc substitutes include but are not limited to the Group IIA elements (e.g., magnesium, calcium, strontium, and barium), which may be used in combination, with different Group IIA elements acting as a substitute for zinc at different zinc sites.

In still another embodiment, the Li$_4$Zn(PO$_4$)$_2$ host lattice can be doped with additional substitutes at the phosphorus site to modify the structure of the host lattice. These "phosphorus substitutes" can be selected to provide for tetragonal coordination with oxygen. Various tetragonal oxide units exhibit different structural sizes relative to PO$_4$. The tetragonal oxide unit or combinations of such units can be chosen to preserve the stability of the host lattice. Further stability can be achieved by compensating substitutions at the Zn site, which in turn can enable greater replacement of the PO$_4$ host lattice unit. Moreover, from the perspective of the optical properties of the scintillating composition, various combinations of tetragonal oxide units can be selected to maximize emission from the luminescent center. The phosphorus substitute can also be selected to modify the electronic properties of the host lattice, improving its sensitivity to alpha and triton particles. Examples of elements that can serve as phosphorus substitutes include but are not limited to silicon, germanium, sulfur, selenium. These elements may also be used in combination, such that while only one element may be present in a particular phosphorus lattice site, a plurality of these elements may be present within the lattice as a whole. Hole-doping can occur if the phosphorus substitute is electron deficient with respect to phosphorus (e.g., silicon or germanium). Conversely, electron-doping can occur if the phosphorus substitute is electron rich with respect to phosphorus (e.g., sulfur or selenium). A neutral substitute (e.g., As) can indirectly change the sensitivity of the host lattice through structural distortions.

In view of the foregoing, the scintillating composition generally can be represented by the following formula:

wherein $X_{Zn}$ is the zinc site in the host lattice, which can be doped with divalent substitutes, and TO$_4$ is a tetragonal oxide unit, which can be PO$_4$ in the case of a pure host lattice, and which can be doped with phosphorus substitutes. The amount of each substitute at the zinc site is a fraction of the total stoichiometric amount of the zinc site. Thus, the sum of the fractional amounts of all of the substitutes at the zinc site should equal 1 (i.e., $[X_{Zn}]_1+[X_{Zn}]_2+[X_{Zn}]_3+ \ldots =1$). The amount of each substitute at the phosphorus site is a fraction of the total stoichiometric amount of the phosphorus site. Thus, the sum of the fractional amounts of all of the substitutes at the zinc site should equal 1 (i.e., $T_1+T_2+T_3+ \ldots =1$).

Turning to FIG. 3, a diagram illustrating a method of making the scintillating compositions described herein is shown. While the steps 50-90 in FIG. 3 are ordered according to one embodiment, it is understood that this order can be modified. Preparation of a scintillating composition first entails obtaining the lithium-6, zinc, and activator precursors, all of which are readily available for purchase. Preferred precursors include but are not limited to soluble salts based on acetates, acetylacetonates, alkoxides, citrates, hydroxides, and nitrates. As indicated by step 50, the lithium-6, zinc, and activator precursors can be dissolved in a suitable solvent such as water to from a solution. The amount of the zinc precursor combined with the solution can be selected to make the Li$_4$Zn(PO$_4$)$_2$ host lattice comprise less than a stoichiometric amount of zinc. Optionally, a compound comprising a zinc substitute also can be added to the solution. The amounts of the activator precursor and the zinc substitute-containing compound added to the solution can be selected to make the scintillating composition comprise relatively low concentrations of the activator and the zinc substitute. For example, the scintillating composition can comprise about 0% to about 10% of the activator and about 0% to about 30% of the zinc substitute, these percentages being by weight of the total scintillating composition.

As indicated by step 60, phosphoric acid is also combined with the solution. The amount of the phosphoric acid combined with the solution can be selected to make the Li$_4$Zn(PO$_4$)$_2$ host lattice comprise less than a stoichiometric amount of phosphorus. Optionally, a compound comprising a phosphorus substitute also can be added to the solution. In some embodiments, the phosphorus substitute-containing compound can be an acid (e.g., silicic acid or sulfuric acid) or an alkoxide (e.g., tetraethyl orthosilicate). The amount of the phosphorus substitute-containing compound added to the solution can be selected to make the scintillating composition comprise relatively low concentrations of the phosphorus substitute. For example, the scintillating composition can comprise about 0% to about 30% of the phosphorous substitute, these percentages being by weight of the scintillating composition.

As indicated by step 70, a base such as ammonium hydroxide subsequently can be combined with the solution to cause a precipitate to form in the solution. The amount of the base added to the solution can be sufficient to make the solution have a pH of, e.g., about 11. This precipitate can be separated via evaporation of the solvent or filtration and washing, as indicated by step 80. Evaporation can be required to prevent the unavoidable loss of soluble intermediates (if present) during filtration and washing. The resulting precipitate can then be heated in, e.g., a firing furnace, at a temperature of about 50° C. to about 1,000° C., more specifically about 500° C. to about 900° C., to crystallize it, thus forming the $Li_4Zn(PO_4)_2$ host lattice comprising an activator and any other substitutes incorporated therein. If present, zinc substitutes become substituted at the zinc site, and phosphorus substitutes become substituted at the phosphorus site.

The scintillating compositions described herein have several advantages. Because the $Li_4Zn(PO_4)_2$ host lattice incorporates enriched lithium (i.e., the lithium-6 isotope) as a solid-state material, all derivative compositions present an extremely high lithium-6 density of about $2.46 \times 10^{22}$ $^6Li$ atoms/cm$^3$. The absorption cross-section of lithium-6 for neutrons is very high. In contrast, the principal non-Li elements have minimal absorption cross-sections. Thus, detectors based on such scintillating compositions weigh less and occupy less space than detectors based on gas or liquid scintillators. These solid-state detectors can therefore be easily transported and stored, making them useful for patrolling and protecting the borders of a country.

Another advantage of the scintillating compositions is that the doped $^6Li_4Zn(PO_4)_2$ host lattice provides both neutron adsorption and optical emission within a single material. This dual-function approach avoids the use of a space-hoarding binder as required for two-component scintillating mixtures (e.g., $^6LiF/ZnS:Ag$). Further, the fission by-products, i.e., alpha and triton particles, induce luminescence directly, without having to migrate to (and penetrate) a second composition. The foregoing properties of the $Li_4Zn(PO_4)_2$ scintillating compositions greatly enhance the probability of photon generation per neutron event, and thus, neutron sensitivity.

Additionally, the scintillating compositions exhibit relatively high emission intensities in response to the absorption of neutrons but yet they undergo little or no self-absorption of the emitted light. Further, the scintillating compositions are insensitive to non-neutron radiation such as radioisotope gamma-radiation. Thus, they can be used to detect radioisotopes without being concerned that they might emit light due to non-neutron exposure. As such, they can be incorporated in hand-held radioisotope identification devices.

EXAMPLES

The following non-limiting example further illustrates the various embodiments described herein.

For the preparation of 40 grams of $Li_4(Zn_{0.99}Mn_{0.01})(PO_4)_2$, the following procedure was used. First, 23.73 grams of lithium hydroxide monohydrate were dissolved into approximately 150 milliLiters (mL) of deionized water in a 250-mL beaker. A 38-mL portion of nitric acid (70.0 weight (wt) % in deionized water) was slowly added to the lithium hydroxide solution. This process converted the hydroxide salt to its nitrate equivalent. Separately, 9.149 grams of Zn (i.e., metal powder) and 0.078 grams of Mn (i.e., metal powder) were suspended by 100-mL of deionized water in a 250-mL Erlenmeyer flask. A 28-mL portion of nitric acid (70.0 wt % in deionized water) was added very slowly (i.e., drop-wise at 1 drop/sec) to this suspension, resulting in an exothermic reaction that evolved gas. The suspended metals were thus dissolved into the deionized water as nitrate salts. For precipitation of the intermediate, both nitrate solutions were combined into a single, larger 600-mL beaker. A 20-mL portion of phosphoric acid (86.6 wt % in deionized water) was mixed into this solution. Then, 181-mL of ammonium hydroxide was added drop-wise, which resulted in a final pH of 11. Precipitation of white particles occurred shortly after the addition of the base. The solution was heated on a hot plate (but below its boiling temperature) to evaporate the water. The remaining white mass was heated at 300° C. for six hours to volatilize off and/or decompose any ammonium nitrate or phosphate residues. The material was ground in a mortar and pestle and fired at 850° C. for 12 hours, leaving the desired product.

As used herein, the terms "a" and "an" do not denote a limitation of quantity, but rather denote the presence of at least one of the referenced item. Also, "optional" or "optionally" means that the subsequently described event or circumstance may or may not occur, and that the description includes instances where the event occurs and instances where it does not. Moreover, the endpoints of all ranges directed to the same component or property are inclusive of the endpoint and independently combinable (e.g., "up to about 25 wt. %, or, more specifically, about 5 wt. % to about 20 wt. %," is inclusive of the endpoints and all intermediate values of the ranges of "about 5 wt. % to about 25 wt. %," etc.). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A scintillating composition for detecting neutrons, comprising a $^6Li_4Zn(PO_4)_2$ host lattice.

2. The scintillating composition of claim 1, further comprising an activator for doping the $^6Li_4Zn(PO_4)_2$ host lattice, the activator being substituted at a zinc site of the $Li_4Zn(PO_4)_2$ host lattice.

3. The scintillating composition of claim 2, wherein the activator comprises an element selected from the group consisting of: manganese, tin, ytterbium, europium, and samarium.

4. The scintillating composition of claim 1, further comprising a zinc substitute that is substituted at the zinc site of the $^6Li_4Zn(PO_4)_2$ host lattice.

5. The scintillating composition of claim 4, wherein the zinc substitute comprises a Group IIA element.

6. The scintillating composition of claim 1, further comprising a phosphorus substitute that is substituted at the phosphorus site of the $^6Li_4Zn(PO_4)_2$ host lattice.

7. The scintillating composition of claim 6, wherein the phosphorus substitute comprises an element selected from the group consisting of: silicon, germanium, sulfur, and selenium.

8. The scintillating composition of claim 1, wherein the composition is insensitive to gamma-ray radiation.

9. A method of making a scintillating composition, comprising:

dissolving a lithium-6 precursor and a zinc precursor in a solvent to form a solution;

combining phosphoric acid with the solution;

combining a base with the solution to form a precipitate; and heating the precipitate to form a $^6Li_4Zn(PO_4)_2$ host lattice.

10. The method of claim 9, wherein an amount of the zinc precursor present in the solution is selected to make the $^6Li_4Zn(PO_4)_2$ host lattice comprise less than a stoichiometric amount of zinc.

11. The method of claim 9, further comprising combining an activator precursor with the solution to dope the $^6Li_4Zn(PO_4)_2$ host lattice with an activator.

12. The method of claim 11, wherein the activator becomes substituted at the zinc site of the $^6Li_4Zn(PO_4)_2$ host lattice.

13. The method of claim 11, wherein the activator comprises an element selected from the group consisting of: manganese, tin, ytterbium, europium, and samarium.

14. The method of claim 9, further comprising combining a compound comprising a zinc substitute with the solution, wherein the zinc substitute becomes substituted at the zinc site of the $^6Li_4Zn(PO_4)_2$ host lattice.

15. The method of claim 14, wherein the zinc substitute comprises a Group IIA element.

16. The method of claim 9, wherein an amount of the phosphoric acid present in the solution is selected to make the $^6Li_4Zn(PO_4)_2$ host lattice comprise less than a stoichiometric amount of phosphorus.

17. The method of claim 9, further comprising combining a compound comprising a phosphorus substitute with the solution, wherein the phosphorus substitute becomes substituted at the phosphorus site of the $^6Li_4Zn(PO_4)_2$ host lattice.

18. The method of claim 17, wherein the phosphorus substitute comprises an element selected from the group consisting of: silicon, germanium, sulfur, and selenium.

19. The method of claim 9, wherein the precipitate is heated to a temperature of about 500° C. to about 900° C.

* * * * *